(12) United States Patent
Kaplan

(10) Patent No.: US 6,380,871 B1
(45) Date of Patent: Apr. 30, 2002

(54) SYSTEM FOR AND METHOD OF SEARCHING FOR TARGETS IN A MARINE ENVIRONMENT

(75) Inventor: Irwin Kaplan, Boynton Beach, FL (US)

(73) Assignee: Optical Systems, Inc., Northport, NY (US)

( * ) Notice: Subject to any disclaimer, the term of this patent is extended or adjusted under 35 U.S.C. 154(b) by 0 days.

(21) Appl. No.: 09/715,256

(22) Filed: Nov. 17, 2000

Related U.S. Application Data

(60) Provisional application No. 60/167,995, filed on Nov. 30, 1999.

(51) Int. Cl.$^7$ .................. G08B 23/00; H04B 10/00; G08G 1/16
(52) U.S. Cl. .............. 340/984; 340/851; 340/555; 359/141; 348/164; 348/135
(58) Field of Search ................. 340/984, 506, 340/851, 435, 436, 545.3, 555, 556, 557, 903; 359/141, 143, 152, 168–170; 356/3, 4.1, 3.07, 3.14, 4.08, 6, 11, 7; 348/164, 173, 135, 143; 385/31; 441/36, 38, 40

(56) References Cited

U.S. PATENT DOCUMENTS

| | | | | | |
|---|---|---|---|---|---|
| 4,050,819 | A | * | 9/1977 | Lichtman | 250/199 |
| 4,290,043 | A | * | 9/1981 | Kaplan | 340/984 |
| 5,146,287 | A | * | 9/1992 | Carder | 340/984 |
| 5,444,441 | A | * | 8/1995 | Sutton | 340/850 |
| 6,126,299 | A | * | 10/2000 | Hypes et al. | 362/259 |
| 6,137,609 | A | * | 10/2000 | Scheps | 359/152 |

* cited by examiner

Primary Examiner—Donnie L. Crosland
(74) Attorney, Agent, or Firm—Kirschstein, et al.

(57) ABSTRACT

An above-the-water system for and method of finding targets, both animate and inanimate, in a marine environment, especially by determining the distance and depth of targets at, above or below the surface of, the water. An optical transmitter transmits infrared and ultraviolet light beams toward different zones of coverage on the water. An optical receiver equipped with a segmented detector separately detects return target reflections. An indicator, including range and depth indicators, provides information as to the distance to the target and, if it is below the water, its depth.

35 Claims, 12 Drawing Sheets

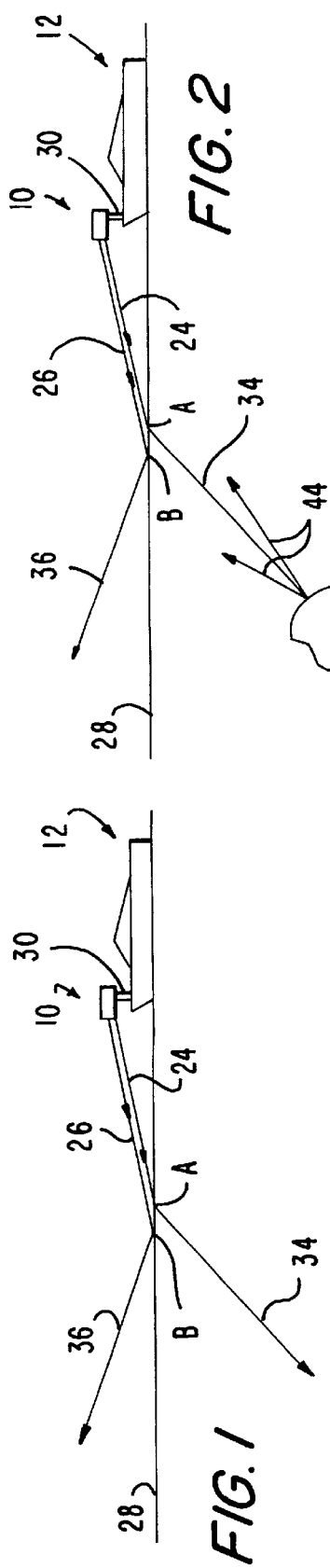
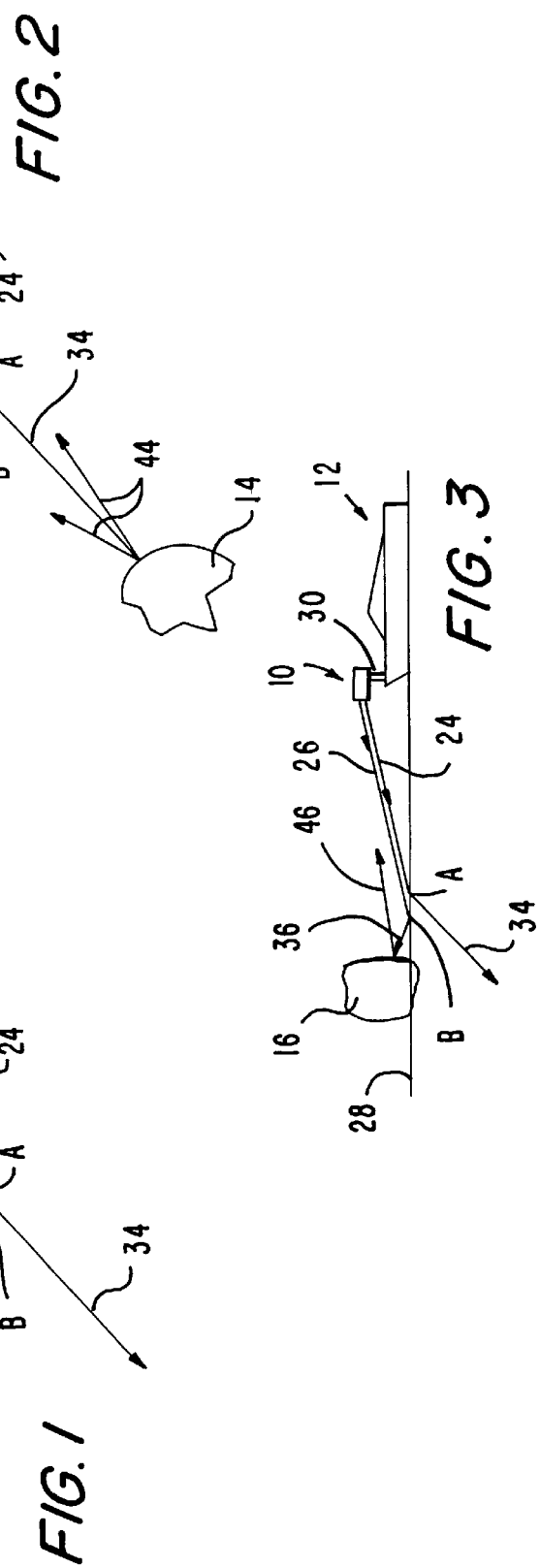
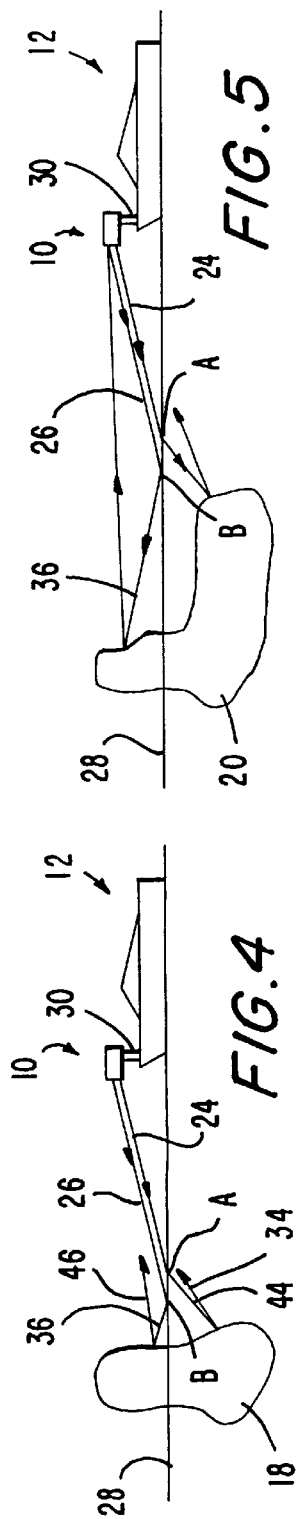
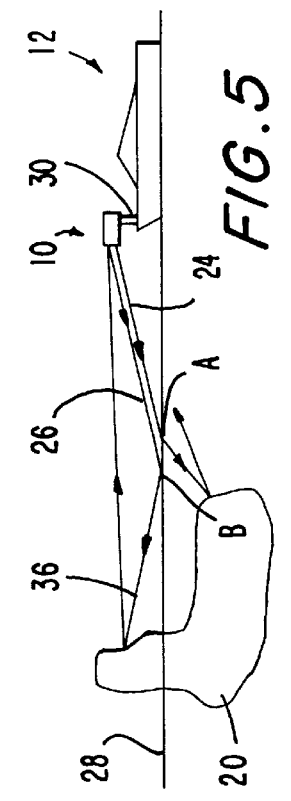
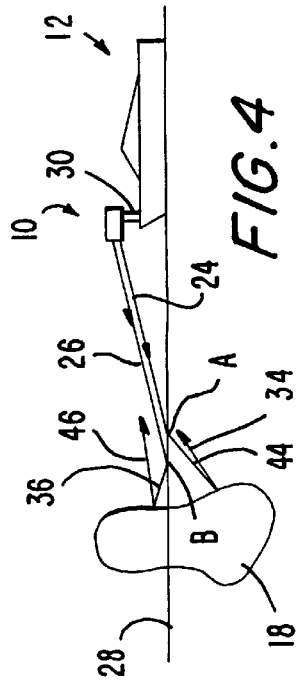

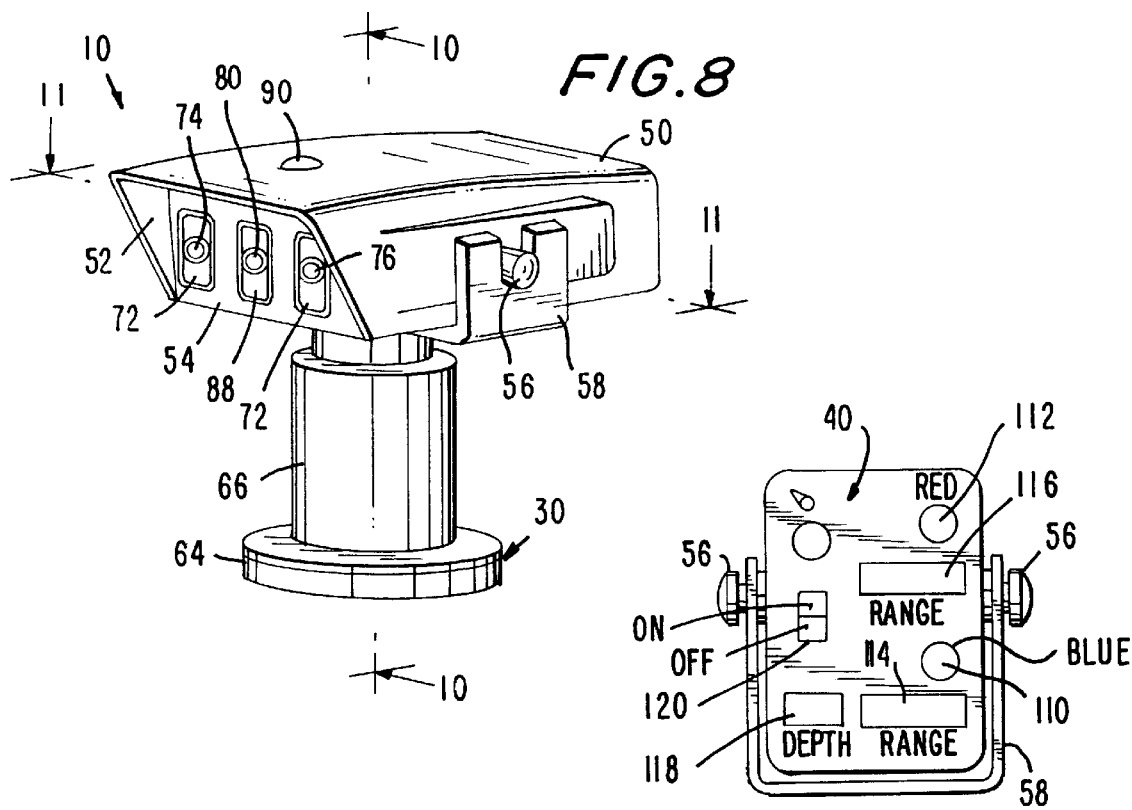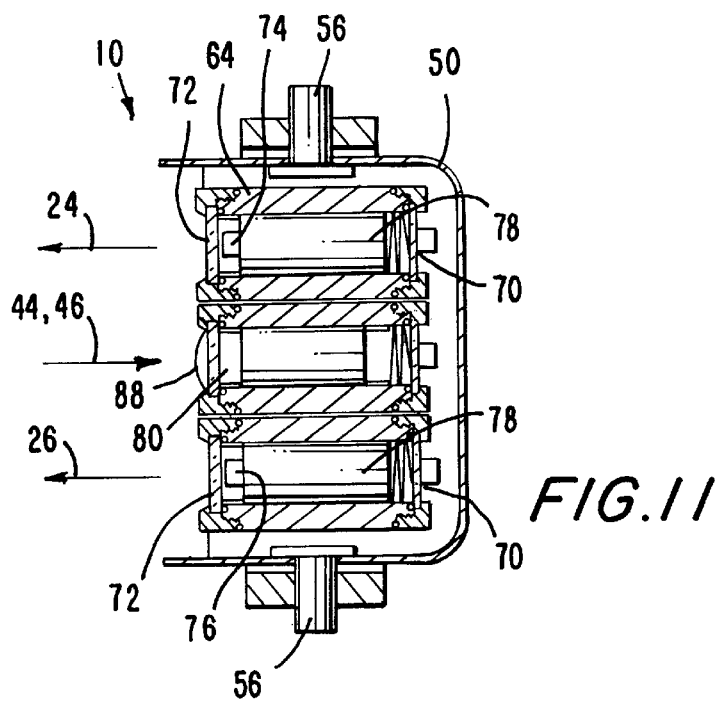

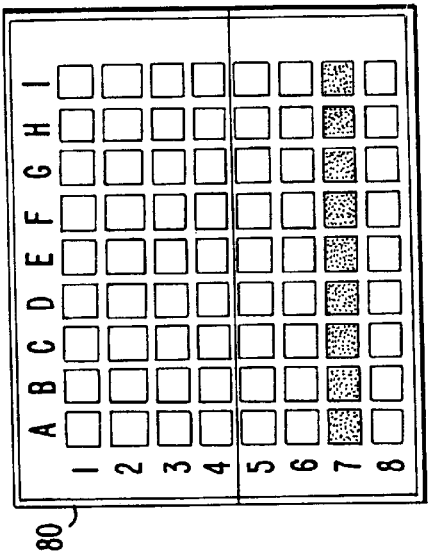
FIG. 17c
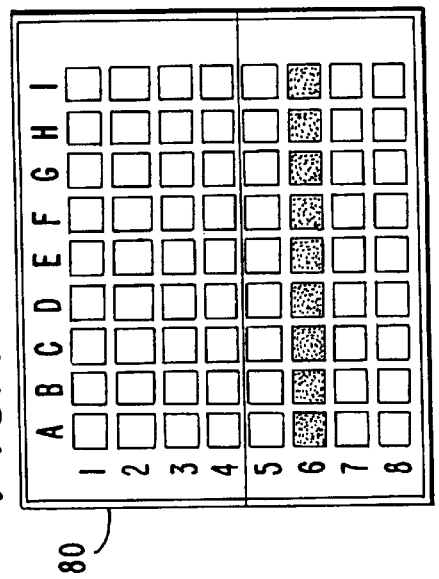
FIG. 17e
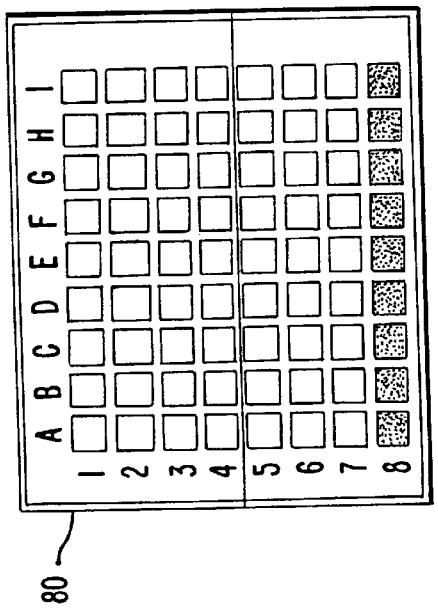
FIG. 17b
FIG. 17d

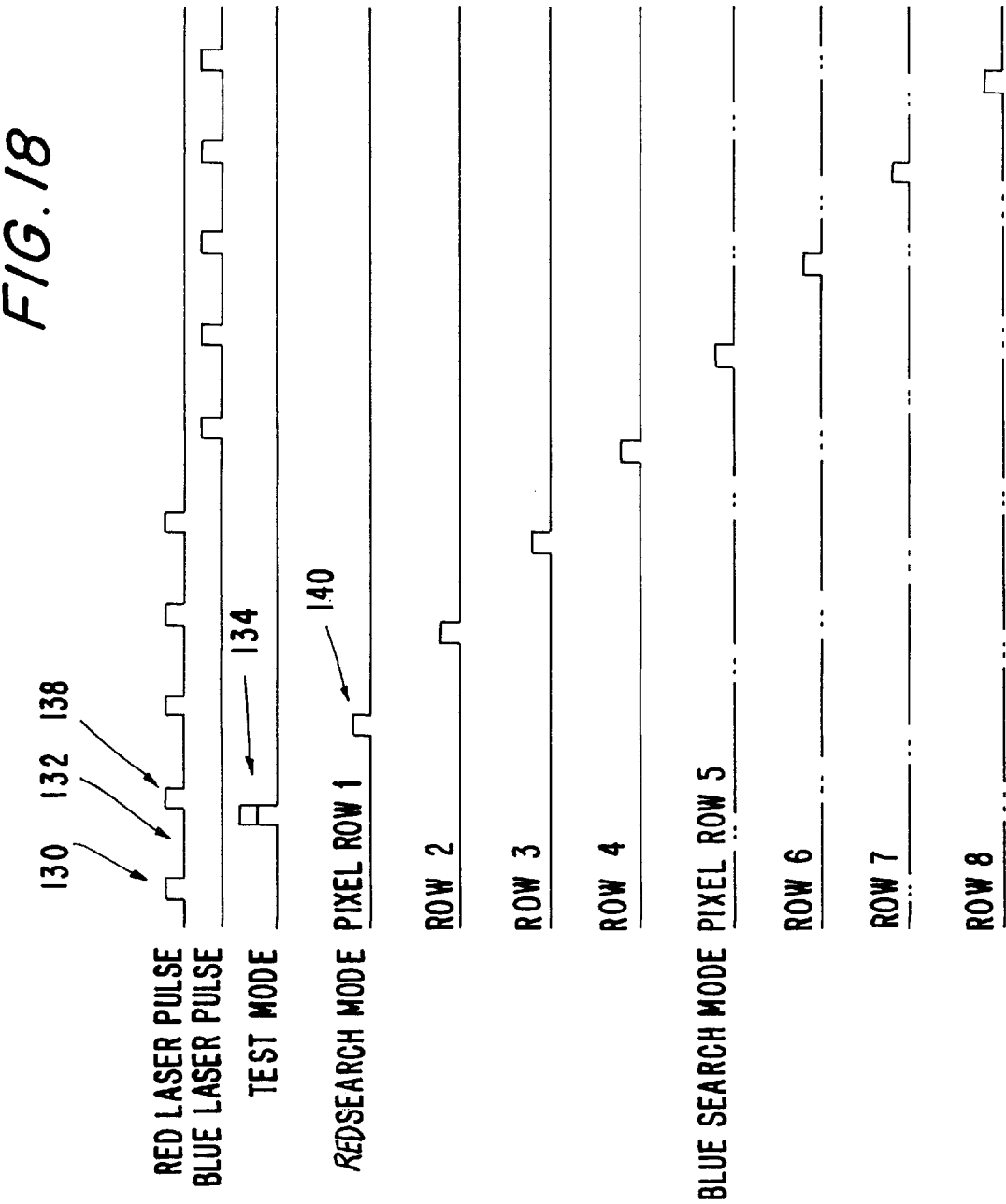

SYSTEM FOR AND METHOD OF SEARCHING FOR TARGETS IN A MARINE ENVIRONMENT

CROSS REFERENCE TO RELATED APPLICATIONS

This application claims priority to U.S. Provisional application Ser. No. 60/167,995, filed Nov. 30, 1999.

BACKGROUND OF THE INVENTION

1. Field of the Invention

The present invention generally relates to searching for targets in a marine environment and, more particularly, to warning of threats and perils in the marine environment, especially of impending collisions and terrorist threats.

2. Description of the Related Art

An optically-based, marine collision avoidance system was disclosed in my earlier U.S. Pat. No. 4,290,043. A light beam was directed from a transmitter on-board a marine vessel at a surface of the water for refraction into, and also for reflection from, the water. If no obstacle was present in the path of the refracted beam, or in the path of the reflected beam, then the refracted and reflected beams continued their propagation away from the transmitter. If an obstacle was present, then return light reflected off the obstacle by either the impinging refracted beam or the impinging reflected beam was detected by a receiver on-board the vessel, and an alarm was sounded. The light beam included optical radiation having wavelengths in the ultraviolet range (300–400 nanometers) for increased water penetration and/or in the infrared range (700–1500 nanometers) for increased water reflectivity. The light beam had wavelengths transmitted exclusively in one of the ranges, or preferably had wavelengths simultaneously transmitted in both ranges.

As advantageous as my patented collision avoidance system was in warning vessel operators of impending collisions with an obstacle, it provided no information as to the precise location of the obstacle. Thus, my patented system simply warned that an obstacle was present somewhere, but did not advise the vessel operator whether the obstacle was underwater, abovewater, or both. Moreover, my patented system did not advise the vessel operator of the range of a floating or abovewater obstacle, or of the depth of an underwater obstacle. This information would have been helpful in advising the operator how much warning time was available to take evasive action, or if evasive action had to be taken altogether.

Other systems which I am aware include:

U.S. Pat. No. 5,042,942 which discloses the transmission of a laser beam from an overhead, tracking aircraft to an underwater body, especially a towed sled;

U.S. Pat. No. 5,146,287 which discloses an on-board laser scanner to detect floating or submerged hazards, such as mines or torpedoes;

U.S. Pat. No. 5,444,441 which discloses an arrangement for detecting underwater objects by using a camera with three separate arrays of detectors to provide concurrent red, blue and green signals;

U.S. Pat. No. 5,646,907 which discloses detecting floating or submerged objects by transmitting an amplitude-modulated laser beam to the objects, and monitoring for acoustic echoes;

U.S. Pat. No. 3,644,043 which discloses a target search and track system operative, during a search mode, to detect infrared light from the target and, during a track mode, to detect laser light reflected from the target;

U.S. Pat. No. 4,047,816 which discloses the use of two light transceivers to track a vehicle in flight;

U.S. Pat. No. 5,345,304 which discloses a target acquisition system for use on a flight vehicle and employs an infrared detector in combination with a laser sensor;

U.S. Invention Registration H341 which discloses a system for scanning a laser beam at high speed with high resolution, and also at low speed with low resolution to steer a telescope at a target; and U.S. Invention Registration H1231 which discloses a system for defending against antiship torpedoes by initially employing sonar to determine the approximate location of an incoming torpedo, and by also employing a blue-green laser to scan the located field of view.

SUMMARY OF THE INVENTION

OBJECTS OF THE INVENTION

Accordingly, it is a general object of the present invention to improve the state of the art as exemplified by U.S. Pat. No. 4,290,043 by distinguishing among underwater targets, abovewater targets, and both abovewater-and-underwater targets.

More particularly, it is an object of the present invention to provide range information as to a distance of an abovewater target relative to a system transmitter.

Still another object of the present invention is to provide depth information as to a distance of an underwater target relative to a system transmitter.

It is yet another object of the present invention to provide both depth and range information of a target, and even to estimate a size of the target.

A still further object of the present invention is to search for human targets in search-and-rescue missions, and in terrorist threats.

Yet another object of the present invention is to search for inanimate targets for collision avoidance.

An additional object of the present invention is to enable system operation twenty-four hours a day, and during different marine conditions.

FEATURES OF THE INVENTION

In keeping with the above objects and others which will become apparent hereafter, one feature of the present invention resides, briefly stated, in a system for, and a method of, searching for targets, both animate and/or inanimate, in a marine environment, comprising a transmitter means, a processor including a receiver means, and an indicator.

The transmitter means is mounted abovewater, for example, on-board a marine vessel, an aircraft, or a seaside structure, such as a pier, a bridge, a marina, or a boat dock. The transmitter means emits first and second beams of optical radiation at first and second zones of water. The first beam has a first wavelength characteristic having wavelengths in the ultraviolet to blue range (300–475 nanometers), hereinafter sometimes referred to as a "blue" beam for simplicity, and capable of entering the first zone of water and being refracted therethrough as a refracted beam. The second beam has a second wavelength characteristic having wavelengths in the infrared range (650–1500 nanometers), hereinafter sometimes referred to as a "red" beam for simplicity, and capable of reflecting from the second zone of water as a reflected beam. The blue and red beams are emitted either by separate transmitters, such as laser light sources, or by a single light source, such as a xenon lamp having means for separating the wide spectrum output of the lamp into separate red and blue beams.

The processor is operative for identifying locations of the targets in the marine environment. The receiver means is operative for separately detecting return target reflections reflected off any targets impinged by the refracted and/or the reflected beams to find an identified target. The return target reflection reflected off a target impinged by the refracted beam, and the return target reflection reflected off a target impinged by the reflected beam, are detected either by separate receivers, or by a single receiver operating in a timewise alternating manner to detect a return target reflection from the refracted beam during one time interval, and to detect a return target reflection from the reflected beam during a subsequent time interval.

The indicator is operative for indicating the identified target. Preferably, the indicator includes a display panel having separate displays for the red and blue beam reflections.

In contrast to the system of my earlier patent described above in which a single beam was propagated forwardly of a vessel, the present invention directs at least two different beams towards at least two different zones of water to obtain two different return target reflections, one by the refracted beam, and another by the reflected beam, and separately detects the return target reflections. If the only target reflection detected is from the refracted beam, then an underwater target is identified. If the only target reflection detected is from the reflected beam, then an abovewater target is identified. If target reflections from both the refracted beam and the reflected beam are detected, then multiple targets are identified, or a single target extending both above and below the water is identified.

In further accordance with this invention, the red and blue beams are pulsed, and the time width of each pulse and the spacing between pulses are known. By determining the time duration from the moment a transmitted pulse is emitted until a corresponding received pulse is detected, the distance or range to a floating or abovewater target can be computed, as well as the depth to an underwater target. The indicator can also display the range and depth information.

Thus, this invention enables targets to be found and categorized with more particularity. Human targets, such as a person requiring rescue, either in a small boat or not, can be identified as a floating target. Terrorists, such as a person or persons intent on causing damage for political purposes, either swimming or being conveyed in a low- or high- profile boat, can be identified as a floating target prior to completing the terrorist mission. Inanimate targets such as floating debris, or seaside structures such as a pier, a dock, a marina, and a bridge, or underwater objects such as a sandbar, a reef or a mine, or abovewater objects such as a bridge support, or objects that extend both above and below the water such as an iceberg, are just a few examples of targets whose depth, range, size and location can be determined by the present invention.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a diagrammatic view of a system according to this invention during searching for targets in a marine environment;

FIG. 2 is a view analogous to FIG. 1 during detection of an underwater object;

FIG. 3 is a view analogous to FIG. 1 during detection of a floating object;

FIG. 4 is a view analogous to FIG. 1 during detection of an object that extends both above and below the water and has a certain configuration;

FIG. 5 is a view analogous to FIG. 4 for an object having a different configuration;

FIG. 8 is a perspective view of one embodiment of a transceiver;

FIG. 9 is a rear elevational view of a display panel of the transceiver of FIG. 8;

FIG. 11 is a sectional view taken on line 11—11 of FIG. 10;

FIGS. 17b–e are successive depictions of the detector during red search mode;

FIG. 18 is a series of pulse diagrams depicting system operation;

FIG. 19 is a top plan, diagrammatic view of zones of coverage during the test mode of FIG. 17a.

DETAILED DESCRIPTION OF THE PREFERRED EMBODIMENTS

Figure 6:
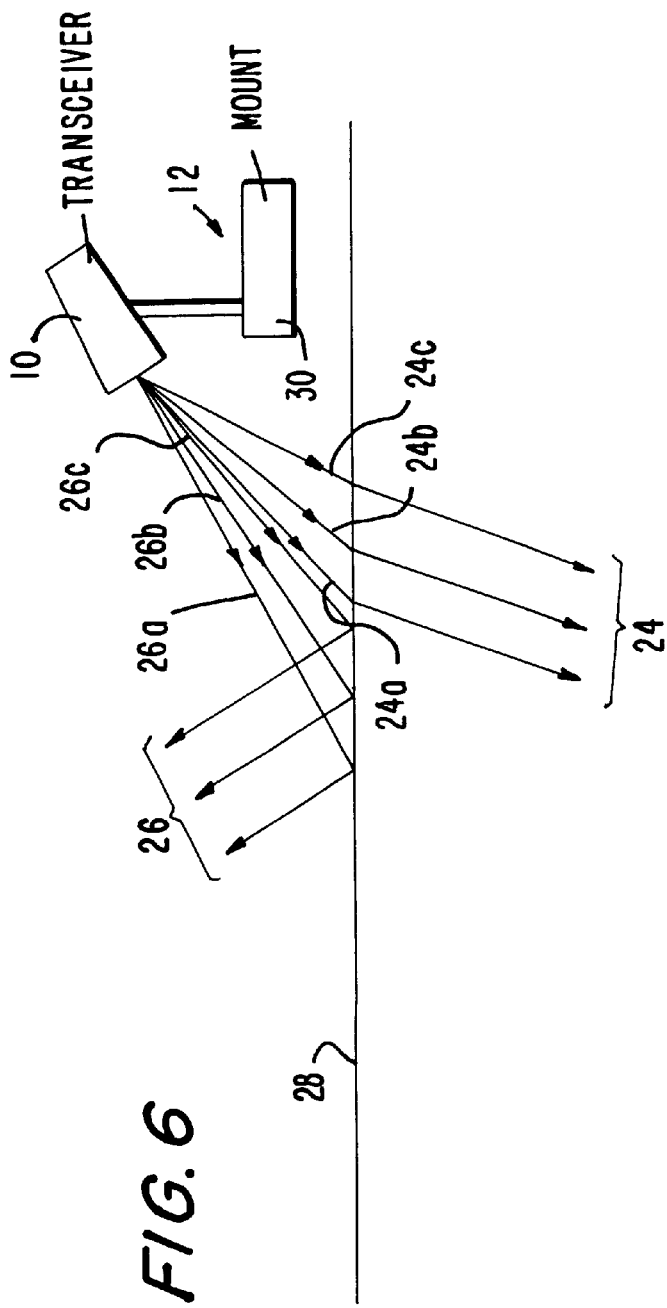
FIG. 6 is a general view of the system of FIG. 1.

Referring now to FIGS. 1–5 of the drawings, reference numeral 10 generally identifies a transceiver mounted on a marine vessel 12 and employed in a system for searching for targets such as an underwater target 14 in FIG. 2, a floating target 16 in FIG. 3, a part-underwater and part-abovewater target 18 of a compact shape in FIG. 4, and a part-underwater and part-abovewater target 20 of a different, irregular shape in FIG. 5.

Although the vessel 12 is depicted as a powerboat, this was done to simplify the drawings since any type or size of marine vessel can serve as a mount for the transceiver, including but not limited to motorboats, sailboats, rowboats, houseboats, yachts, catamarans, hydrofoils, warships, etc. The transceiver could equally well be mounted on an aircraft such as a helicopter or airplane operative for conducting search-and-rescue or reconnaissance missions in a marine environment. The transceiver can also be mounted on a seaside structure, such as a pier, dock, marina, bridge, bridge support, etc. Whether mounted on a stationary or a movable mount, the transceiver 10 is mounted on an abovewater support in a marine environment.

The targets need not be inanimate objects as shown, but could include a person or persons requiring rescue, or terrorists threatening a marine vessel or seaside structure. Examples of inanimate targets include underwater or floating mines, reefs, sandbars, debris, icebergs, buoys, seaside structures, bridge supports, etc.

Figure 15:
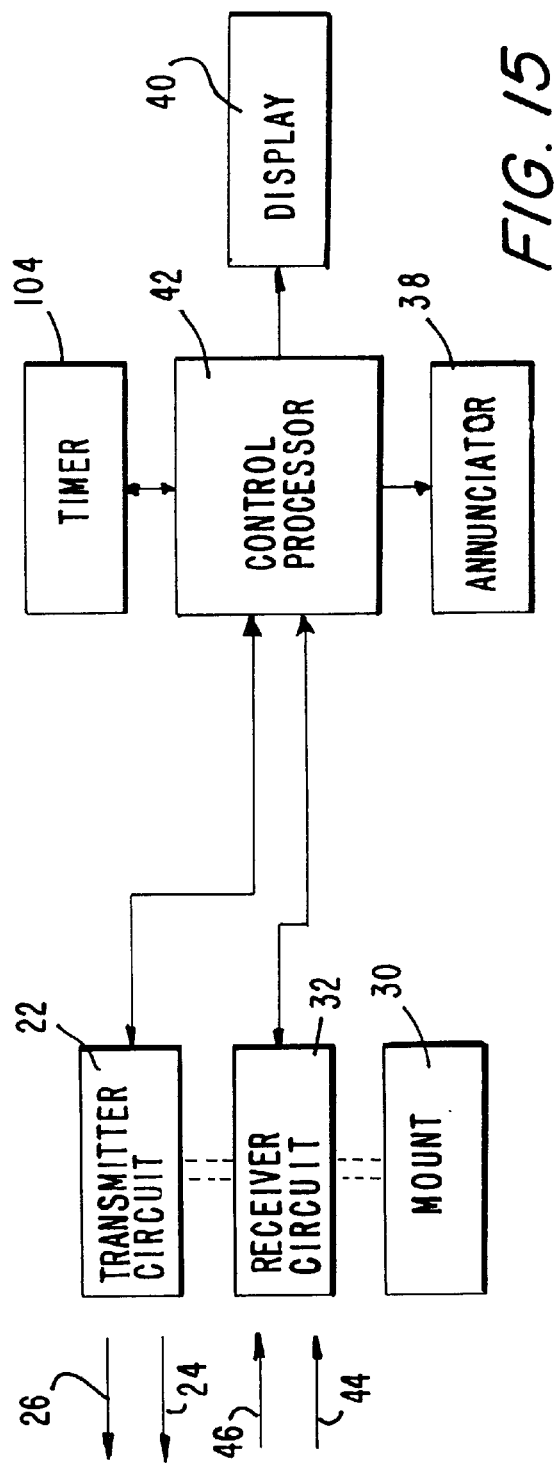
FIG. 15 is an overall view of a system according to this invention.

The transceiver 10 includes a transmitter circuit 22 (see FIG. 15) for emitting at least two beams of optical radiation. A first beam 24 has a first wavelength characteristic in a wavelength range including blue and ultraviolet light (300–475 nanometers) and is hereafter referred to as a "blue" beam for simplicity. A second beam 26 has a second wavelength characteristic in a wavelength range including infrared light (650–1500 nanometers) and is hereafter referred to as a "red" beam for simplicity.

The blue beam 24 preferentially penetrates seawater. The red beam 26 preferentially reflects from seawater. The transmitter circuit 22 is tilted down and faces the air-water interface or water surface 28 shown generally horizontal in FIGS. 1–5 for simplicity. The blue and red beams are directed along respective paths each extending away from the transceiver and the vessel, and downwardly towards the water surface 28.

As shown in FIG. 1, blue beam 24 impinges on the water surface at first zone A, penetrates the first zone, and is refracted in the water as a refracted beam 34. Red beam 26 impinges on the water surface at second zone B, and is reflected from the water as a reflected beam 36. As described below, the zones A and B occupy different areas of the water surface, with zone A preferably being closer to the transmitter circuit than zone B.

Figure 7:
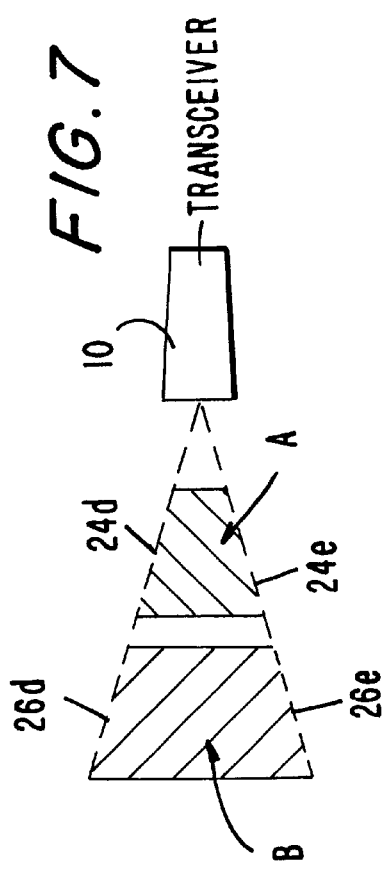
FIG. 7 is a top plan view of the system of FIG. 6.
Figure 10:
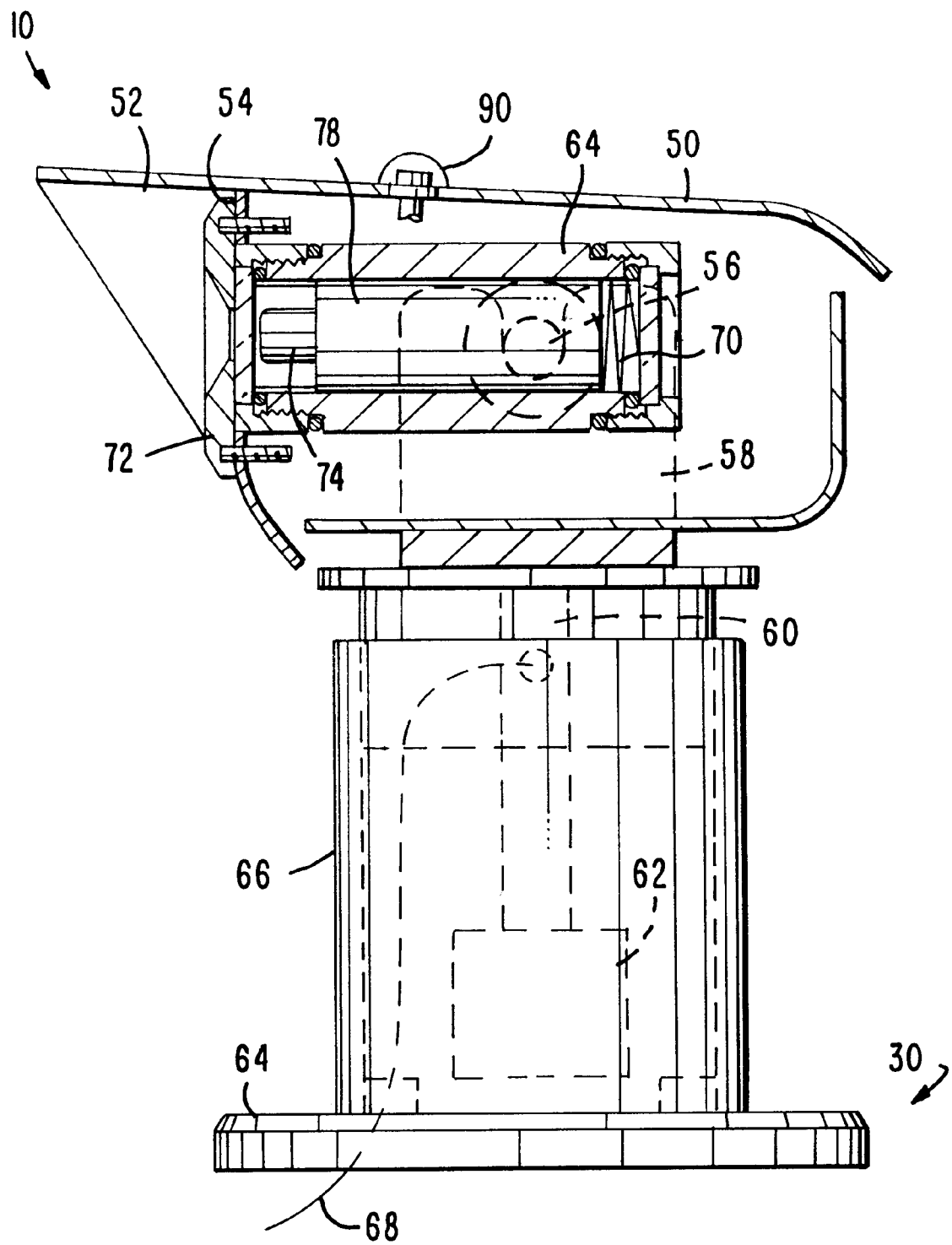
FIG. 10 is an enlarged sectional view taken on line 10—10 of FIG. 8.

The drawings of FIGS. 1–5 are simplistic renderings because, as shown in FIGS. 6 and 7, each of the blue and red beams are generally conically-shaped. As considered in a vertical plane (FIG. 6), the blue beam 24 is bounded by an upper ray 24a, a lower ray 24c, and a central ray 24b which lies along the optical axis of symmetry. As considered in a horizontal plane (FIG. 7), the blue beam 24 is bounded by a right ray 24d and a left ray 24e. Similarly, the red beam 24 is bounded by an upper ray 26a, a lower ray 26c, a central ray 26b which lies along the axis of symmetry, a right ray 26d and a left ray 26e. The zones A and B are marked in FIG. 7 and, as shown, are offset although, in some cases, they may partially overlap.

Returning to FIGS. 1–5, the beams 24, 26, 34, 36 are not shown as conically-shaped, but instead, are represented by their respective central rays in order not to unduly encumber the drawings. The transceiver 10 is adjustably mounted on a mount 30 so that the zones impinged by the blue and red beams 24, 26 are controlled. Any acute angle can be selected for the angle of inclination that a respective beam makes with the horizon. The inclination angle depends also upon the location of the transceiver relative to the mount 30 and the water surface. As described below, optical elements in the path of the respective beams control the dimensions of zones A and B and their location relative to the transceiver. Preferably, the inclination angle is on the order of 0.1° to about 3°.

The transceiver 10 includes a receiver circuit 32 (see FIG. 15) controlled by a control processor 42 and operative for separately detecting return target reflections reflected or scattered off any targets impinged by the refracted beam 34 and/or the reflected beam 36 in order to find a target and identify its location in the marine environment. In FIG. 1, the refracted and reflected beams 34, 36 continue their propagation away from the transceiver because there is no obstacle in their paths to scatter impinging beams. In FIG. 2, the submerged obstacle 14 scatters only the refracted beam 34 and redirects return target reflections 44 to the receiver circuit. In FIG. 3, the floating obstacle 16 scatters only the reflected beam 36 and redirects return target reflections 46 to the receiver circuit. In FIG. 4, the obstacle 18 scatters both the refracted and the reflected beams 34, 36 and redirects return target reflections 44, 46 to the receiver circuit. In FIG. 5, the obstacle 20 also scatters both the refracted and the reflected beams 34, 36 and redirects return target reflections 44, 46 to the receiver circuit. As described below, range and depth information for the individual return target reflections help to distinguish the different configurations of the obstacles 18, 20. This information is visibly displayed on a display panel 40 (FIG. 9).

As also described below, an annunciator circuit 38 (see FIG. 15) is operative for indicating the presence of the identified target. The annunciator circuit 38 can emit one warning for each target, or different warnings for different targets. The warnings can be audible and/or visible.

FIGS. 8–11 illustrate a preferred embodiment of the transceiver 10. The transceiver includes a housing 50 having a hood 52 for shielding a front face 54 from direct sunlight. The display panel 40 may be situated at a rear face of the housing 50, but preferably is mounted away from the transceiver within sight of an operator. A pair of stub shafts 56 supports the housing for pivoting movement on a fork 58. The housing 50 is mounted on an upper end of a stabilizer rod 60 whose lower end is connected to a stabilizer weight 62. The mount 30 includes a deck mounting plate 64 and a hollow cylindrical tube 66 on which the fork 58 is mounted. The rod 60 and weight 62 are free to move within the tube 66 as the angular attitude of the vessel changes relative to the water surface to maintain a vertical orientation.

The transmitter circuit 22 and receiver circuit 32 are mounted in a watertight casing 64 within the housing 50. Entry and exit vents in the housing, assisted if necessary by a cooling fan (not illustrated), provide cooling of the transmitter/receiver circuits. An electrical cable 68 supplies electrical power to these circuits.

The transmitter circuit 22 includes a blue laser 74 for emitting the blue beam 24, and a discrete red laser 76 for emitting the red beam 26. The lasers may be tubes or diodes. Springs 70 urge the lasers toward exit windows 72. Drivers 78 energize the lasers 74, 76. The windows 72 can incorporate focusing lenses, or separate focusing lenses can be used to optically modify the beams 24, 26.

Figure 14:
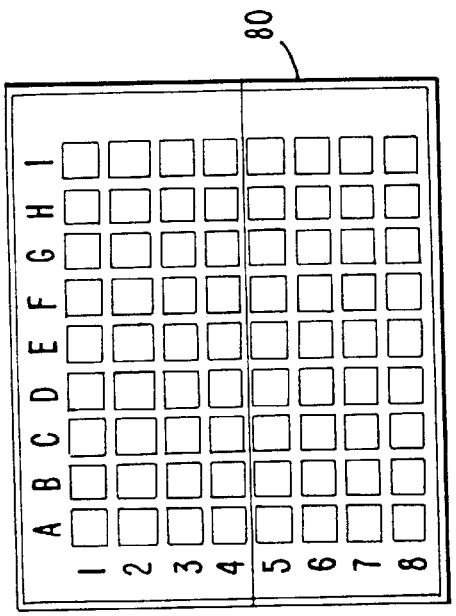
FIG. 14 is a front elevational view of the receiver of FIG. 13.

The receiver circuit 32 includes a detector 80 having an arrayed surface divided, as shown in FIG. 14, into multiple rows 1–8 and columns A–I of cells or pixels. A blue filter 84 covers the upper half of the detector or rows 1–4. A red filter 86 covers the lower half of the detector or rows 5–8. The filters 84, 86 can be discrete or integral. A focusing lens 88 is located in front of the filters 84, 86 and directs the returning blue rays 44 to the upper rows 1–4 through the blue filter 84, and also directs the returning red rays 46 to the lower rows 5–8 through the red filter 86. The focusing lens 88 can serve as an entrance window on the housing 50, or a separate window can be provided.

As previously noted, the red beam 26 reflects off the water. Actually, a small amount of the red beam penetrates the water. However, this small amount is negligible. More importantly, the blue beam 24 refracts into the water; however, a small, non-negligible amount of the blue beam reflects off the water. If this blue beam reflection strikes an obstacle at or above the surface, its reflection towards the receiver circuit makes it impossible to determine whether or not this reflection comes from an object above or below the surface. A requirement of this system is that the red beam is used only for objects at or above, and the blue beam is used only for objects at or below, the water's surface.

Hence, the filters 84, 86 specifically direct one beam to impinge on one half of the area or field of view of the detector, and the other beam falls on the other half or the remaining field of view. In other words, the filters 84, 86 restrict the red and blue reflections to specific areas of the detector. Now, due to the tilt of the transceiver relative to the water, blue reflections can only be associated with obstacles that are at and below the surface, and red reflections can only be associated with targets at and above the surface.

An ambient light detector 90 is mounted on the housing pointing upwards away from the water surface. The detector 90 is covered by a translucent dome that averages the ambient light. This detector 90 is used to automatically adjust the gain of the main detector 80. The transmitters 74, 76 and the detector 80 are mounted in separate housings such that none of the emitted beams can go directly to the detector 80.

Figure 12:
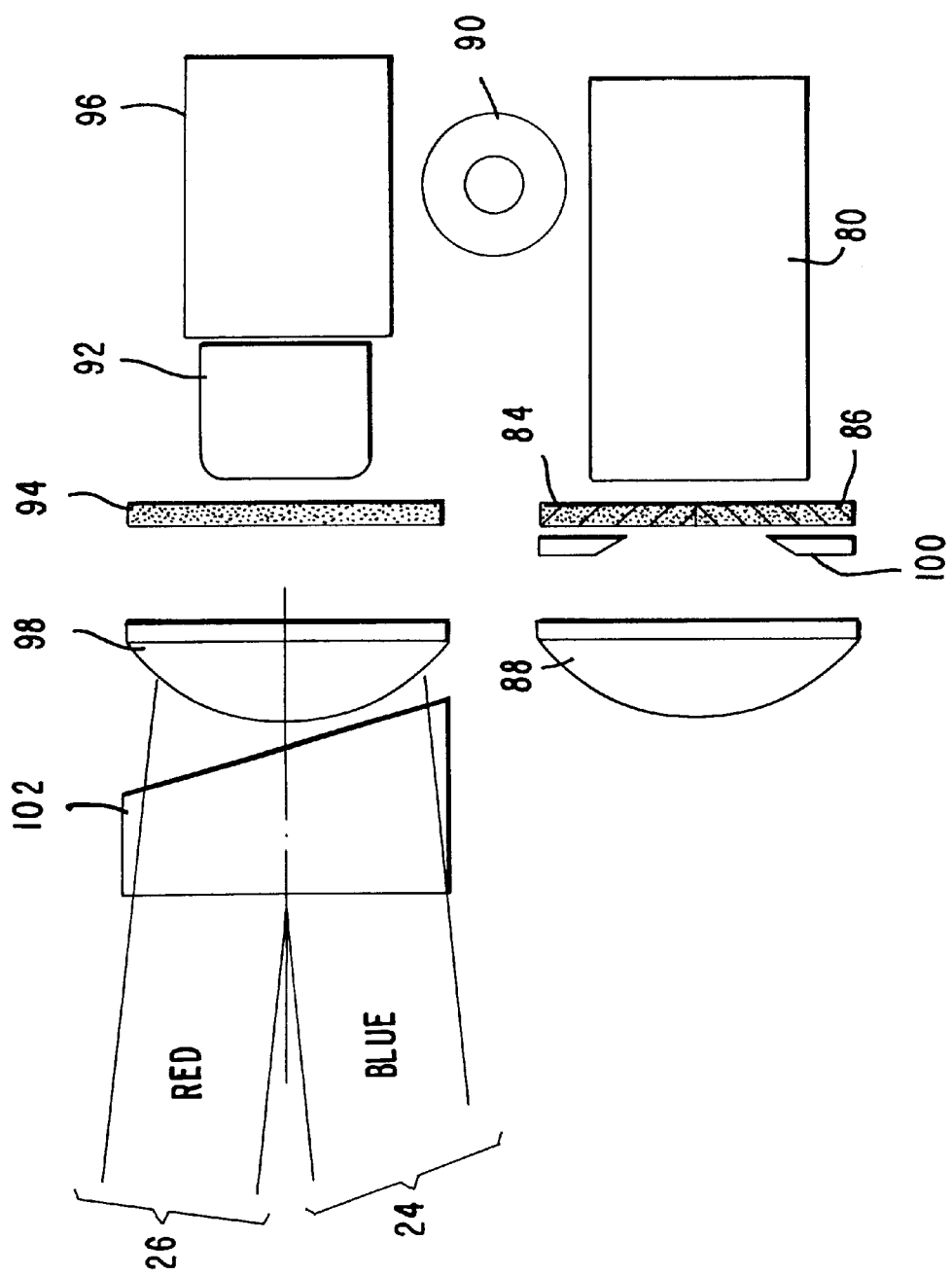
FIG. 12 is a schematic view of another embodiment of a transceiver.

In accordance with another embodiment depicted in FIG. 12, a xenon flash tube 92 is a rich source of both red and blue light. Therefore, only one transmitter is needed in this transmitter circuit. However, whereas the red and blue wavelengths of the dual lasers discussed above are selected to be invisible to the eye, the xenon lamp requires a filter 94 to accomplish this task.

The xenon lamp is plugged into a trigger socket 96. Filter 94 and a focusing lens 98 are located in front of the lamp 36. The detector 80 has a red/blue split filter 84, 86 and the lens 88 in front of it. An aperture stop 100 in front of the detector 80 limits the field of view of the detector 80. The ambient light detector 90 faces upwards and has a translucent dome over it in order to average ambient light.

An optical prism 102 separates the red and blue light into two separate beams. In this way, even a single emitter source can be used so that each of the main wavelengths, red and blue, may be used with optimum efficiency. Note, that without the wedge, all of the emitted red light and all of the emitted blue light would be superimposed on the same area on the water. The blue light at the farthest edge of the illuminated pattern on the water would not be able to refract into the water. The red light at the nearest edge of the pattern (close to the transceiver) would not be able to refract into the water. There would be a significant loss of energy, and system performance would be deteriorated.

Hence, the transmitter circuit can have one or more transmitters. Likewise, the receiver circuit can have one or more detectors.

The control processor 42 in the preferred embodiment controls the drivers 78 and pulses the blue and red beams with a known time width for each pulse and a known spacing between pulses. Preferably, the blue and red beams are pulsed alternatingly. The processor 42 includes a timer 104 for counting the time duration from the moment each pulse is transmitted until it returns as a reflection to the receiver in order to compute the distance to the target.

Returning to the display panel 40 of FIG. 9, the detection of a target reflection 44 is indicated by a "blue" light indicator 110, and the detection of a target reflection 46 is indicated by a "red" light indicator 112. The computed distance between the moment a blue beam pulse is emitted and the detection of a received blue beam reflection is indicated numerically by a blue range indicator 114. The computed distance between the moment a red beam pulse is emitted and the detection of a received red beam reflection is indicated by a red range indicator 116. The computed depth between the water surface and the height of a submerged object is indicated by a blue depth indicator 118. The depth computation takes into account the different speed of blue light in air and in seawater and, of course, the index of refraction of seawater. An on/off switch 120 is also located on the display panel.

Figure 13:
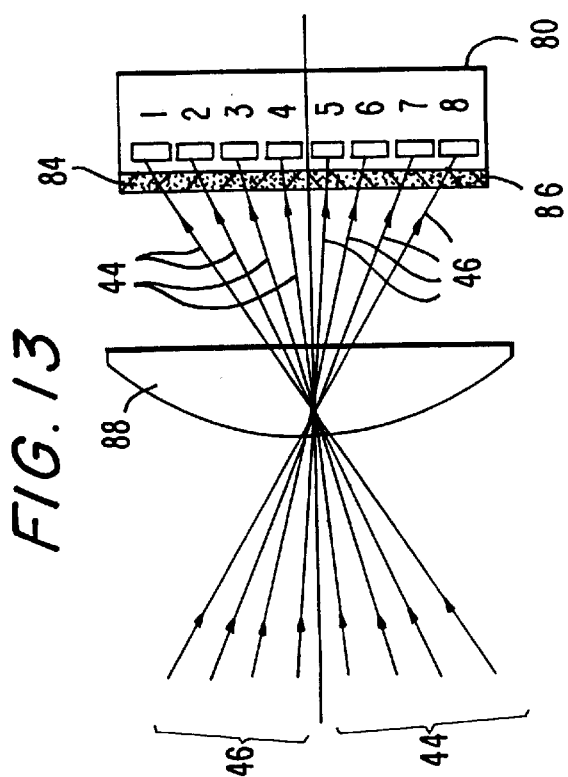
FIG. 13 is a view of one embodiment of a receiver.
Figure 16:
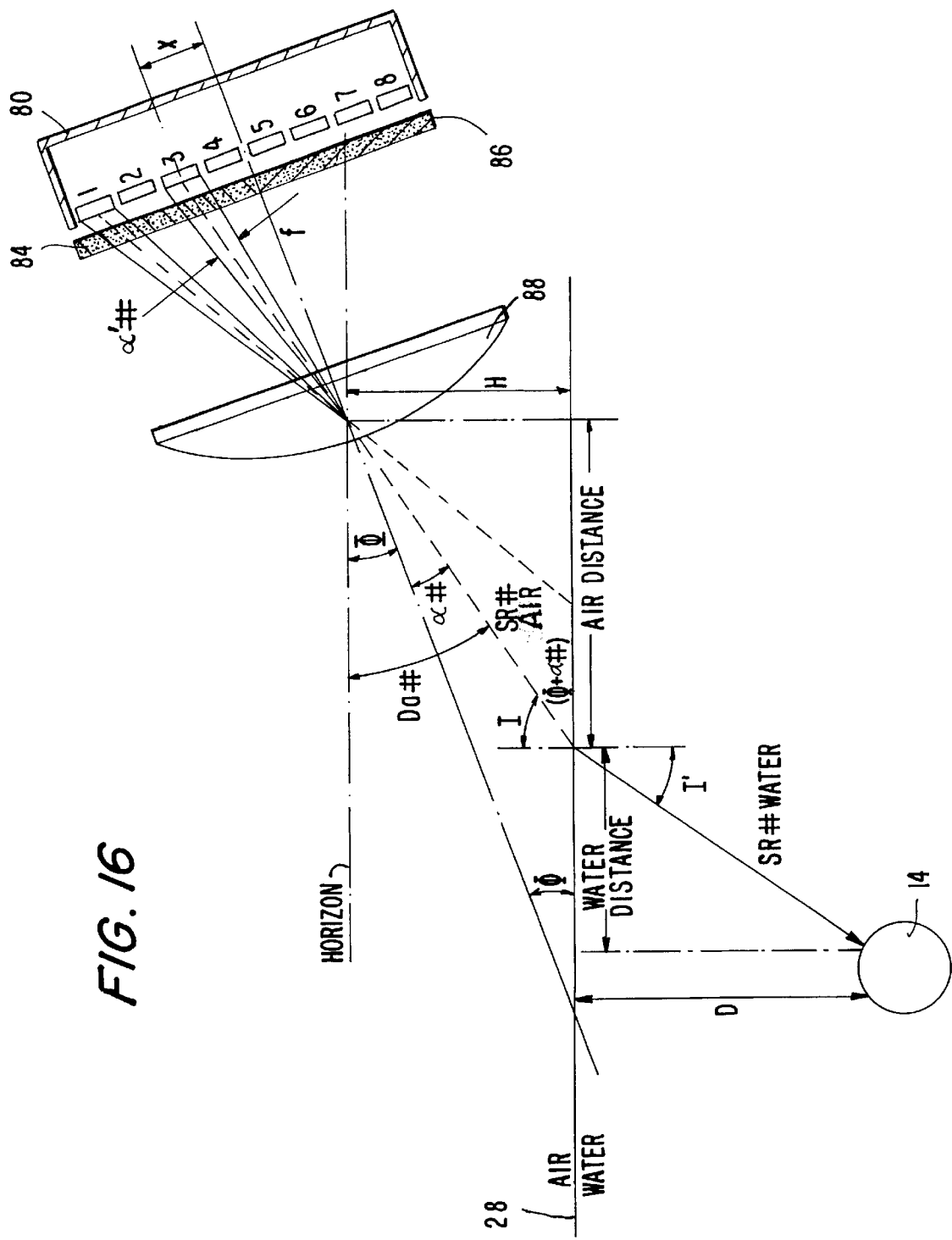
FIG. 16 is a view depicting geometrical relationships at work in the system.
Figure 17G:
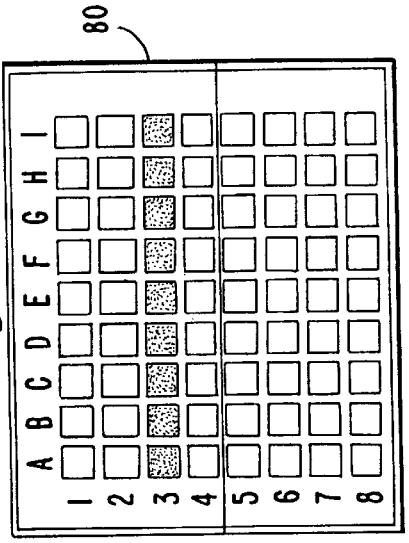
FIGS. 17f–i are successive depictions of the detector during blue search mode.
Figure 17I:
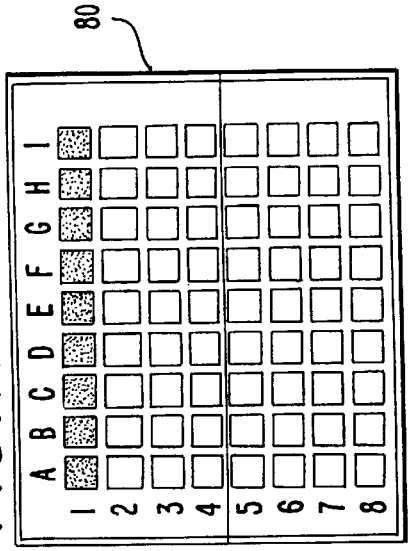
Figure 17F:
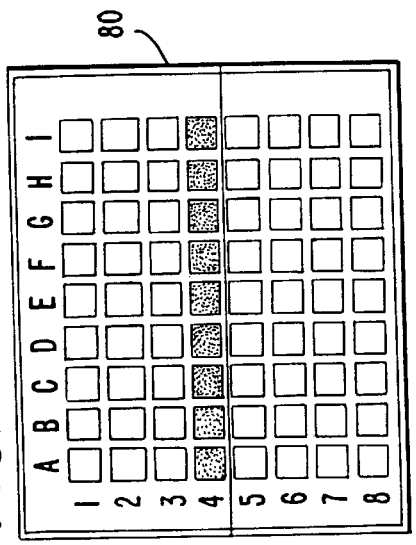
Figure 17H:
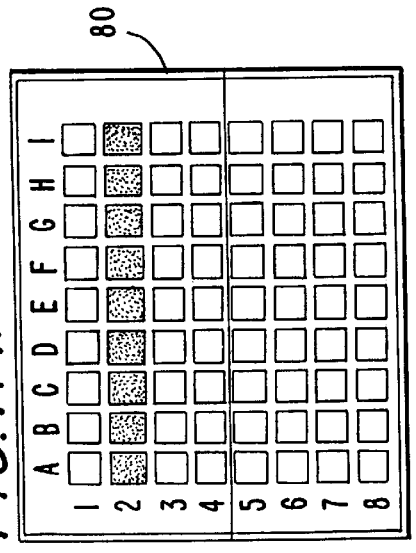

FIG. 16 illustrates the geometry in more detail. There are as many "specific rays" in a system as there are pixel rows. FIG. 13 schematically shows eight pixel rows so that there are eight specific rays. If the detector has 256 rows, then there are 256 specific rays. Each ray is identified by the pixel row number on which it impinges.

Knowing the height H (FIG. 16) of the transceiver above the water surface 28 and the inclination angle (angle Φ) of the specific ray relative to the horizon, the length of the specific ray (from the lens 88 to the water) may be calculated. Although every specific ray has the same height, each has a different inclination angle and a different length. The arithmetic value of this length is stored in a memory bank of a microprocessor in the processor 42.

The pixel or cell is the smallest element of resolution. It is not possible to identify where the light is falling on the individual pixel. The pixel's location, from row 1 to row 8, defines "specific rays" 1 to 8. For example, specific ray 2 impinges on pixel row 2 and specific ray 4 impinges on pixel row 4. In the view shown in FIG. 13, each row of pixels identifies a specific ray which, based on the focal length of the lens 88, defines a specific angle. The angle formed by the size of the pixel and the focal length of the lens 88 defines the limiting resolution of the system.

FIG. 16 illustrates the angle of inclination Φ and a representative specific ray $SR\#_{air}$. The angle $\alpha\#$ must be added to inclination angle Φ to form the specific depression angle $Da\#$. This angle is $(\Phi+\alpha\#)$. The equations that determine $SR\#_{air}$ are as follows:

$$\alpha'\# = \arctan x\#/f \qquad 1.$$

$$\alpha = \alpha' \qquad 2.$$

$$Da = (\Phi + \alpha\#) \qquad 3.$$

$$\sin(\Phi + \alpha\#) = H/SR\# \qquad 4.$$

$$SR\#_{air} = H/\sin(\Phi + \alpha\#) \qquad 5.$$

$$\text{calculated time}_{air} = SR\#_{air}/\text{pulse width} \qquad 6.$$

$$SR\#_{water} = [(\text{measured time}/2) - (\text{calculated time})] \times \text{pulse width} /n'_{water} \qquad 7.$$

$$\text{Depth} = SR\#_{water} \times \cos I' \qquad 8.$$

$$\text{distance}_{air} = SR\#_{air} \times \cos(\Phi + \alpha\#) \qquad 9.$$

$$\text{distance}_{water} = SR\#_{water} \times \sin I' \qquad 10.$$

$$\text{total distance} = \text{distance}_{air} + \text{distance}_{water} \qquad 11.$$

$$\text{warning time} = \text{total distance}/\text{velocity} \qquad 12.$$

where $\alpha$ is the offset distance of each row relative to the optical axis, f is the focal distance of the lens 88, $\alpha'\#$ is the angle subtended by each row between the lens 88 and the detector 80, α# is the angle subtended by each ray between the lens 88 and the target, SR#$_{air}$ is the distance in air of each specific ray between the lens and the water surface, SR#$_{water}$ is the distance in water of each specific ray between the water surface and the target, n' is the index of refraction of seawater, and I' is the angle subtended by the refracted ray.

Of critical importance is the equation for the path length of the specific ray SR#$_{water}$. Basically, the underwater path SR#$_{water}$ is determined by subtracting the total measured time of flight of the pulse, minus the calculated time that the pulse travels in air. The remainder is the time that the pulse spent underwater. This time is then corrected by the index of refraction of the water. See equation 7.

As previously stated, the system's geometry is dependent on the height of the transceiver above the water. Obviously, during rough seas, the bow of a vessel will "bob" up and down. The transceiver is gimbaled, and will maintain its inclination angle Φ, but certainly the height will be constantly changing. Another feature of this invention provides means for constantly monitoring and measuring the height of the transceiver above the water. It also provides means for manually entering the height and inclination angle into the processor 42 during initial system installation.

Figure 17A:
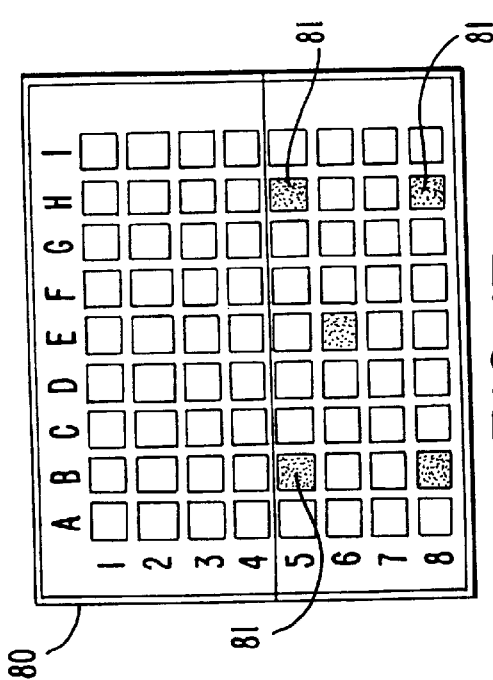
FIG. 17a is a depiction of the detector during a test mode.
Figure 17:
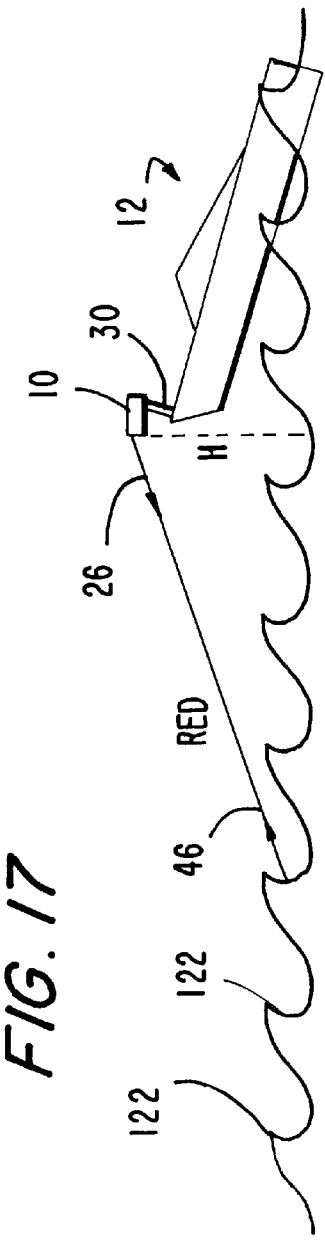
FIG. 17 is a depiction of a transceiver at work in rough water.

Actually, it is not height that is important. It is the air distance, from the transceiver to the water surface 28, of each specific beam that must be determined. To do this, consider that there are two sea states of interest, calm water and rough water. Calm water is defined as not having whitecaps. Rough water is defined as having whitecaps 122 (FIG. 17). In calm water, red beam 26 reflects away from the transceiver. The processor expects a return signal from a reflection at a specific time. If it does not receive this signal, the processor makes the determination that the water is calm, and the height H of the transceiver is known.

On the other hand, if the water is rough, the red beam 26 will reflect from a whitecap back towards the transceiver, as shown in FIG. 17. Upon receiving this signal, the processor compares the time that the specific ray returns with the time stored in the memory bank for that specific ray. If the time is different, the processor computes a new air distance and does this for each and every specific ray in the system and stores these new values in memory. This process occurs several hundred times a second. Each interrogation of the detector "freezes" the up and down motion of the ship. A special detector interrogation mode is used solely to determine the height (or specific ray's length) of the transceiver above the water.

A special pulse mode is used to determine the air distance of a specific ray. During a first test mode, the gain of the detector 80 is adjusted to a maximum value based on an ambient signal input from the ambient light detector 90. A red beam pulse is emitted from the red transmitter 76 and, at the appropriate time, a few red pixels in rows 5–8 are interrogated, as schematically shown in FIG. 17*a*. If the water is calm, no return signal is detected. No signal indicates calm water and the stored specific ray air distances remain, without change, in memory. This is repeated several times a second. The detector pixels that are interrogated form a "matrix pattern", which as shown in FIG. 17*a* includes five pixels. This pattern, as well as the ambient light detector's signal, are the foundation for monitoring the air distance and, hence, the height of the vessel. Of course, if a signal is received during the test mode, the processor immediately calculates and adjusts all the stored air distances.

The next mode is called the "red search mode". During this second mode, the gain of the detector 80 is adjusted so as to not detect whitecaps. Now, the detector is interrogated, row by row (or pixel by pixel). The interrogation sequence occurs as shown in FIGS. 17*b*–17*e*. If a signal is returned, the information is processed and the appropriate alarm and range information are displayed.

The third and final mode is called the "blue search mode". It operates in the same manner as the red search mode except that a different section of the detector is interrogated as shown in FIGS. 17*f–i*. If a signal is detected, the depth and range will be displayed.

As depicted in the pulse sequence diagrams of FIG. 18, a red laser pulse 130 is emitted and followed by a time delay 132. The detector 80 is placed into "test mode" and, if the water is rough, a signal 134 is received. The amplitude of the signal 134 is shown double height to indicate that the ambient light signal detector 90 has adjusted the gain of the main detector 80 to the maximum level. The time it takes for the signal 134 to arrive is used by the processor to determine the length of the specific rays.

The system now shifts to "red search mode" and the detector gain is lowered to a value that will not detect whitecaps. A second laser pulse 138 is emitted. There is a time delay until pulse 140 returns. This pulse 140 is shown in normal amplitude. If there is no obstacle, then this signal 140 would not be evident. If a signal 140 is present, then the alarm is sounded, and the range to the obstacle is displayed.

FIG. 18 shows pixel rows 1 through 8 as having received signals. This means that these diagrams represent an obstacle that is located above and below the water and is equi-distant from the vessel. All the returned signals have the same time delay.

This pulsing sequence is repeated several to hundreds of times a second. The frequency of repetition is dependent on specific system requirements. The pulsing sequence of this invention is not limited to that shown in FIG. 18. In some embodiments, the output shape of the light pattern may be different such as a line scan. Obviously, the interrogation of the detector would follow that specific pattern.

Figure 19:
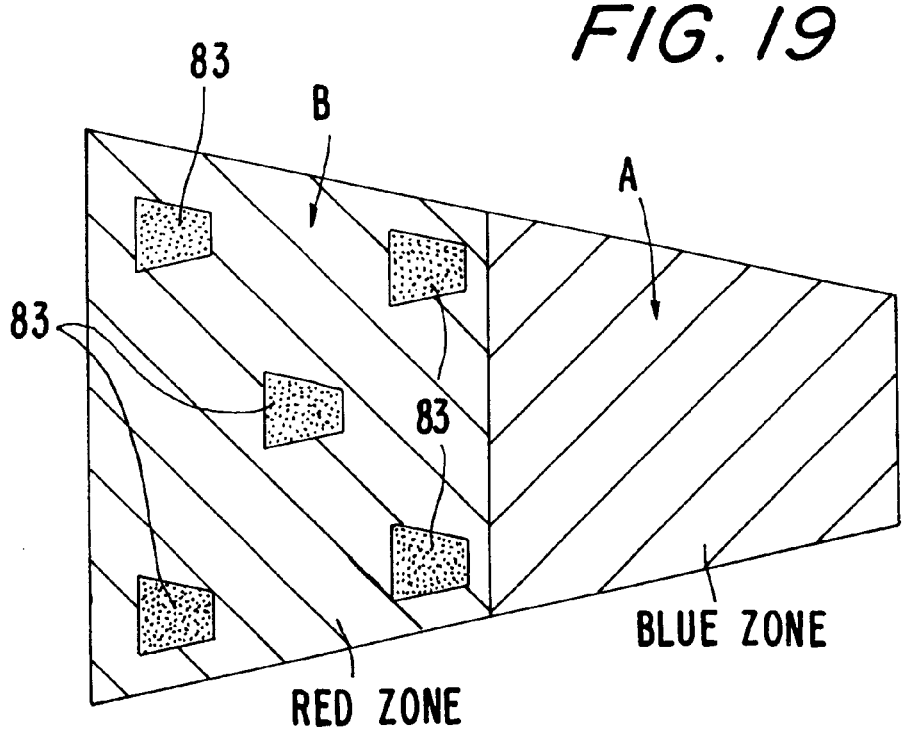

The red test mode is a special feature of this invention. The shaded areas 83 shown in FIG. 19 represent areas on the water that would be imaged on the shaded pixels 81 of the detector 80 shown in FIG. 17*a*. These pixels may be interrogated simultaneously or sequentially. The sole purpose of the test mode is to detect the presence of whitecaps and whitecaps only.

During the test mode, a reflection from either a target or whitecaps does not and cannot sound an alarm. Instead, the signal is processed to determine specific ray lengths and is used in conjunction with the ambient light signal to set the gain of the main detector 80 prior to the emission of a search mode pulse. Of course, it is possible that an obstacle may be located somewhere in the red zone during the test mode. The matrix pattern is designed to minimize any chance that a target will be located in test area 83 such as shown in FIG. 19. Even if it is located in an area seen by a pixel, its reflection will be averaged with the signals received by all five pixels. That means that the reflectance from the target will represent only 20% of all the energy seen by the detector 80 during the test mode.

Although only five pixels are depicted for purposes of discussion, some detectors will have many more pixels. The smaller each pixel, the smaller the projected test area on the water and the less chance that an obstacle will influence signals during the test mode. Even if the obstacle is extremely large, it is unlikely to be large enough to intercept any more than one of the five pixel water patterns.

The amplitude of the test mode signals received by the detector 80 is added to the ambient light signal received from ambient light detector 90. This combined signal represents total background illumination of water and sky. This illumination decreases the dynamic detection range of the detector 80. It is noise, and it can cause false alarms. The gain of the detector is automatically changed to diminish the effects of this background illumination. This gain adjustment occurs after each and every test mode and just before a search mode is initiated.

The ambient light detector's 90 translucent dome is designed and located so that it responds to all background illumination that will influence the detector 80, with the exception that it does not cover the area of the water that the detector 80 does. In this manner it is simple to isolate the signals coming from whitecaps and that coming from all other sources. For example, at night time and during calm water, there will be no significant ambient light or any reflection from whitecaps. Under these conditions the detector gain will be set to a maximum. During rough seas at night time, only the whitecaps will affect the gain. During calm waters in the day time, the background illumination seen by the ambient light detector 90 will adjust detector 80 gain. If, during the same ambient illumination, the water becomes rough, then only the average signal coming from the detected whitecaps will adjust the gain. The signal from the ambient detector 90 will remain the same. Then, only a target of a size and reflectivity that produces a signal somewhat larger than that produced by the whitecaps during the test mode, will produce an alarm.

Small changes in the inclination angle results in large changes in the computed depth of a submerged target, as well as the warning time. In one geometry, a difference of 2° in inclination angle results in a five-fold difference in detection depth, and about a two-fold increase in the warning time.

As the wavelength of the blue and red beams 24, 26 approach the size of air molecules, atmospheric backscatter can be diminished by physically separating the transmitter and receiver circuits and/or by gating the receiver circuit, especially if the emitted beam pulses are narrow in width. A 10 ns pulse width covers about 10 feet in air. If the receiver circuit is turned off for the first 100 feet of travel by an emitted beam pulse, and thereupon turned on for a period of time during which a target reflection is expected to be returned if a target is present, then the backscatter is significantly reduced and, in effect, enables the system to effectively operate in "fog" conditions.

Gating also minimizes the triggering of false warnings caused by rough seas. Even on windless days, the surface of the water exhibits a substantial degree of optical irregularity. On windy days, ripples, whitecaps, and even the smooth water portion of whitecapped waves disperses the incident beams in a random manner. Some portion of the refracted and reflected light is totally lost, and some of this dispersed energy may reach the receiver circuit and trigger a false alarm.

A single pulse of a blue beam is emitted from the transceiver. From the time the pulse is emitted until the time the blue beam enters the water, a shutter or gate in the receiver circuit is kept closed. Not until the blue beam gets below the ripples (or whitecapped water) underneath the water surface is the receiver gate opened. Even though a portion of the emitted pulse reflects from the water surface back towards the receiver circuit, it cannot be received or processed as a false alarm signal. Only the blue reflection reflected from, and only from, an underwater target, can sound an alarm.

Hence, it is desired that the gate be opened so that a target at, or below, a "gate line" underneath the water surface may be detected. It is also important that the gate line be parallel to the water's surface. Specific rays of the blue beam have a different length, or to put it another way, take different times to reach the water. To make the gate line parallel to the water, the gate for each specific ray must open and close at a different time. Since each specific ray reports to a specific pixel row, the interrogation of each pixel row is done in synchronization with the emitted pulses.

Therefore, the gate is opened and closed, pixel row by pixel row, based on the pixel row that is being interrogated. The processor changes the gate time for each specific blue ray and its associated pixel row. The information for adjusting the time of each pixel row gate is obtained from the test mode. The test mode is constantly updating the processor with geometric information on the length of the specific rays. Obviously, the length of the specific rays is a means of knowing exactly the location of the water surface in relationship to the transceiver.

Although a large area of the water is being covered by the transmitter circuit, only a line scan portion, equivalent to a projected image of a pixel row on the water, is being seen by the receiver circuit.

Figure 20:
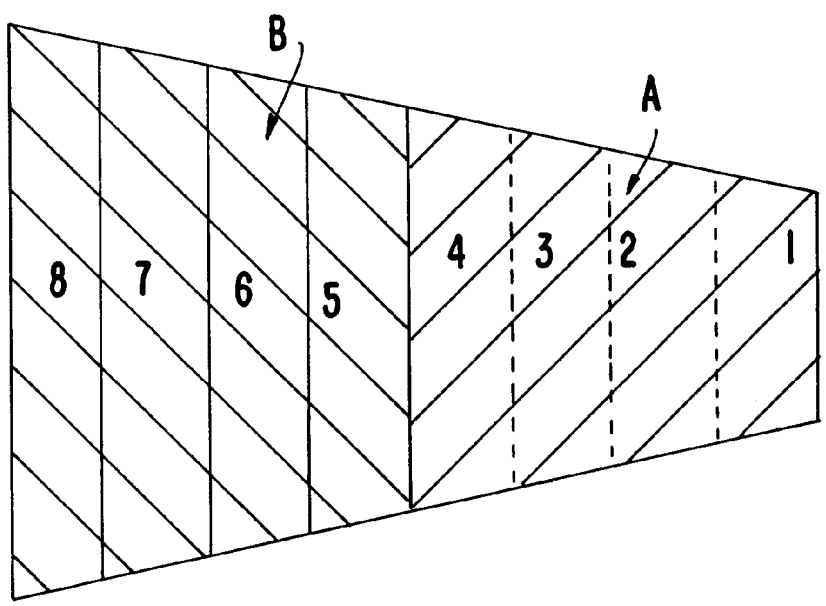
FIG. 20 is a top plan, diagrammatic view of scanned zones of coverage during the search modes of FIGS. 17b–17i.

The efficiency of the radiant output power of the transmitter circuit may be significantly increased (laser, xenon, mercury arc or other radiant sources) if the projected beam energy is shaped into either a linear area or a spot. As shown in FIG. 20, four scan areas 150 are shown for the red zone B, and four scan lines 152 are shown for the blue zone A. Scan area 8 of the red beam on the water corresponds to matching pixel row 8 of the detector 80 (FIG. 17*b*). After pixel row 8 is interrogated, the red beam is moved to position 7 and, once again, pixel row 7 is interrogated (FIG. 17*c*). In this manner, row by row of the detector is gated and scanned, while looking for a returned target reflection.

The same approach may be used with a projected blue or red beam shaped into a spot. In this instance, each individual pixel will be interrogated one by one.

Regardless whether a line or spot scan method is used, a means for moving the beam in a prescribed pattern must be included in the transmitter circuit. Acousto-optic crystals, scanning mirrors, vibrating lens, and other mechanical means are useful ways of steering the projected light beams.

As described so far, a single pulse of light striking a target is detected by a receiver. An alarm is sounded, if and when, the returned target reflection is above a preset threshold. This threshold is set by the ambient light detector 90 controlling the gain of the detector 80. However, if a target's location, size, or reflectivity returns a reflection whose signal strength is not above the single pulse preset threshold, then the received signal is stored in an integrator circuit. The integrator circuit accumulates the received signals in the form of a stored voltage. The amplitude of each stored voltage is added and, when the value of the amplitude exceeds the threshold, then the alarm is sounded. The integrator significantly improves warning time and is another advantageous feature of this invention.

Hence, this invention is not only generally useful for locating targets, both animate or inanimate, but also is useful as a marine obstacle collision avoidance system mounted on a marine vessel, that not only alerts a helmsman as to the potential danger of a collision with a maritime obstacle, but also gives warning as to its location. The system reveals whether the obstacle is above, at, or below the surface of the water and gives the distance and depth of the obstacle. The system operates during the day and the night and in fog.

The system includes a transmitter circuit mounted on the vessel above the air-water interface. The transmitter circuit emits two beams, one in the infrared (red) region, and the other in the ultraviolet (blue) region of the optical part of the electromagnetic spectrum. The red and blue sources of radiation may be generated by a single source, or by separate sources.

The system includes a processor for pulsing, in an alternating manner, the discrete red and blue light beams. This entirely eliminates crosstalk and signal processing errors between the red and blue beams. During the firing of a red beam pulse, if a return reflection is detected, it can only be from an object at, or above, the water. The red beam's wavelength cannot penetrate into the water. If a blue return reflection is detected, then it can only be from an object at, or below, the water. If both signals are detected, then it is from an object that is both below and above the water.

The red and blue beams are directed to, and projected on, distinct and separate zones on the water. The red zone is optimized for detecting objects at or above the water while the blue zone is optimized to detect obstacles at or below the water.

The system includes a receiver circuit equipped with an arrayed detector and a special split red/blue filter that eliminates unwanted, above the surface, blue reflections. This filter also serves the purpose of minimizing unwanted background illumination, and making it possible to determine whether an obstacle is below, at, or above the waterline.

If the transmitter circuit consists of two separate lasers, then the red laser is aligned to point further away from the vessel than the blue laser. Such misalignment constructs a separate red zone and a separate blue zone. This distinctly novel arrangement significantly improves water depth penetration and warning time.

If the transmitter consists of a single radiation emitting source such as a xenon flash tube, then it is equipped with an optical wedge or prism. This wedge directs the emitted red and blue beams along different directions and projects onto separate red and blue zones on the water. Although this approach does not allow for alternate pulsing of the red and blue beams, it, nevertheless, represents a significant improvement over the art.

According to another feature of this invention, the transmitter/receiver unit is maintained at a constant line of sight regardless of the attitude of the vessel. Also, the transmitter/receiver unit protects all interior components from the harsh marine environment and provides proper cooling by using waterproof vents. The unit itself is removable from its mount for security reasons.

In a red test mode of operation, the geometric height (or length of far field specific rays) of the system above the water's surface is determined.

A range gating feature not only penetrates fog, but also eliminates unwanted reflections from whitecaps.

A linear or spot scanning transmitter synchronized with an interrogation of pixel rows or single pixels respectively of a detector optimizes the power density output of a radiant source. This improves the system's ability to detect obstacles at longer ranges and greater depths.

An integrator is employed to improve system detection of very small, or very distant, targets. The integrator stores signals that are below an alarm threshold. If there really is an obstacle, then the integrator adds each received signal until the sum of the signals is above the threshold, and then sounds the alarm.

Hence, the projection onto separate zones, and the separate detection of reflections, of red and blue emissions is employed to detect not only the location, but also the size, of obstacles to be avoided in a marine environment. Distance of the obstacle is determined by pulse counting.

It will be understood that each of the elements described above, or two or more together, also may find a useful application in other types of constructions differing from the types described above.

While the invention has been illustrated and described as embodied in a system for and method of searching for targets in a marine environment, it is not intended to be limited to the details shown, since various modifications and structural changes may be made without departing in any way from the spirit of the present invention.

For example, more than one transceiver can be mounted on a vessel. Also, a single transceiver can be mounted for rotation or for oscillation about a vertical axis and serve as a search beacon.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A system for searching for targets in a marine environment, comprising:

a) an abovewater-mounted transmitter means for emitting and directing, at a first zone of water, a first beam of optical radiation having a first wavelength characteristic enabling the first beam to refract through the first zone as a refracted beam, and for emitting and directing, at a second zone of water different in location than, and spaced apart from, the first zone, a second beam of optical radiation having a second wavelength characteristic different from the first wavelength characteristic and enabling the second beam to reflect from the second zone as a reflected beam;

b) a processor for identifying locations of the targets in the marine environment, including a receiver means for separately detecting return target reflections reflected off any targets impinged by the refracted and the reflected beams to find an identified target; and c) an indicator responsive to the processor, for indicating the identified target.

2. The system of claim 1, wherein the first wavelength characteristic includes a range of wavelengths having 475 nanometers as an upper limit, and wherein the second wavelength characteristic includes a range of wavelengths having 650 nanometers as a lower limit.

3. The system of claim 1, wherein the first and second beams are angularly spread apart by an acute angle.

4. The system of claim 1, wherein the first zone is closer to the transmitter means than the second zone.

5. The system of claim 1, wherein the transmitter means includes a first transmitter for transmitting the first beam, and a second transmitter for transmitting the second beam.

6. The system of claim 1, wherein the transmitter means includes a single transmitter for transmitting a common beam, and an optical modifying component for separating the common beam into the first and the second beams.

7. The system of claim 1, wherein the indicator indicates that the identified target is an underwater target when the return target reflection detected by the receiver means is solely from the refracted beam.

8. The system of claim 1, wherein the indicator indicates that the identified target is at least partly an abovewater target when the return target reflection detected by the receiver means is solely from the reflected beam.

9. The system of claim 1, wherein the indicator indicates that the identified target extends at least partly abovewater and partly underwater when the return target reflections detected by the receiver means are from both the refracted and the reflected beams.

10. The system of claim 1, wherein the receiver means includes a first optical filter for allowing only the return target reflection from the refracted beam to reach the receiver means, and a second optical filter for allowing only the return target reflection from the reflected beam to reach the receiver means.

11. The system of claim 10, wherein the receiver means has an array of light detectors, and wherein the first optical filter covers a part of the array, and wherein the second optical filter covers a remaining part of the array.

12. The system of claim 1, wherein the processor controls the transmitter means for alternatingly emitting the first and the second beams at different times, and wherein the receiver means is operative for alternatingly receiving the return target reflections from the refracted and the reflected beams.

13. The system of claim 1, wherein the processor includes a timer for timing a first time duration between the emitting of the first beam and the detecting of the return target reflection of the refracted beam, and for timing a second time duration between the emitting of the second beam and the detecting of the return target reflection of the reflected beam; and wherein the processor includes means for determining a depth from the first time duration, and for determining a range from the second time duration.

14. The system of claim 12, wherein the processor controls the transmitter means to emit each of the first and the second beams as a series of pulses.

15. The system of claim 1, wherein the processor includes means for measuring a height above the water of the transmitter means relative to the water surface.

16. The system of claim 1, wherein the processor includes means for sweeping the first beam over the first zone, and for sweeping the second beam over the second zone.

17. The system of claim 1, wherein the processor controls the receiver means to initially detect return target reflections from the first zone during a first search mode, and to subsequently detect return target reflections from the second zone during a second search mode.

18. The system of claim 1, wherein the processor includes means for calibrating the receiver means during a test mode by detecting reflections from the water at a plurality of spaced-apart areas within the second zone.

19. The system of claim 1, wherein the processor activates the receiver means to be operative only after the first beam is below the water.

20. The system of claim 1, wherein the processor controls the receiver means to be operative only after a respective beam has been emitted.

21. A method of searching for targets in a marine environment, comprising the steps of:
a) emitting and directing, at a first zone of water, a first beam of optical radiation having a first wavelength characteristic enabling the first beam to refract through the first zone as a refracted beam, and emitting and directing, at a second zone of water different in location than, and spaced apart from, the first zone, a second beam of optical radiation having a second wavelength characteristic different from the first wavelength characteristic and enabling the second beam to reflect from the second zone as a reflected beam;
b) identifying locations of the targets in the marine environment, by separately detecting return target reflections reflected off any targets impinged by the refracted and the reflected beams to find an identified target; and
c) indicating the identified target.

22. The method of claim 21, wherein the first wavelength characteristic includes a range of wavelengths having 475 nanometers as an upper limit, and wherein the second wavelength characteristic includes a range of wavelengths having 650 nanometers as a lower limit.

23. The method of claim 21, wherein the first and second beams are angularly spread apart by an acute angle.

24. The method of claim 21, wherein the identified target is an underwater target when the return target reflection detected is solely from the refracted beam.

25. The method of claim 21, wherein the identified target is at least partly an abovewater target when the return target reflection is solely from the reflected beam.

26. The method of claim 21, wherein the identified target extends at least partly abovewater and partly underwater when the return target reflections detected are from both the refracted and the reflected beams.

27. The method of claim 21, wherein the first and the second beams are alternatingly emitted at different times, and wherein the return target reflections are alternatingly received from the refracted and the reflected beams.

28. The method of claim 21, and further comprising the step of timing a first time duration between the emitting of the first beam and the detecting of the return target reflection of the refracted beam, and timing a second time duration between the emitting of the second beam and the detecting of the return target reflection of the reflected beam; and the step of determining a depth from the first time duration, and determining a range from the second time duration.

29. The method of claim 27, wherein the first and the second beams are emitted as a series of pulses.

30. The method of claim 21, and further comprising the step of measuring a height above the water.

31. The method of claim 21, and further comprising the step of sweeping the first beam over the first zone, and sweeping the second beam over the second zone.

32. The method of claim 21, wherein the return target reflections from the first zone are initially detected during a first search mode, and the return target reflections from the second zone are subsequently detected during a second search mode.

33. The method of claim 21, and further comprising the step of determining a condition of the water by detecting reflections from the water at a plurality of spaced-apart areas within the second zone.

34. The method of claim 21, wherein the detecting step is performed only after the first beam is below the water.

35. The method of claim 21, wherein the detecting step is performed only after a respective beam has been emitted.

* * * * *